Jan. 20, 1970         M. L. FREEMAN            3,490,734
                         BALL VALVES
Filed Feb. 14, 1966                       5 Sheets-Sheet 1

INVENTOR
MATHEW L. FREEMAN
BY Strauch, Nolan, Neale, Nies & Bronaugh
ATTORNEYS Jan. 20, 1970   M. L. FREEMAN   3,490,734
BALL VALVES
Filed Feb. 14, 1966   5 Sheets-Sheet 2

INVENTOR
MATHEW L. FREEMAN
BY Strauch, Nolan, Neale, Nies & Bronaugh
ATTORNEYS

Jan. 20, 1970    M. L. FREEMAN    3,490,734
BALL VALVES
Filed Feb. 14, 1966    5 Sheets-Sheet 4

INVENTOR.
MATHEW L. FREEMAN
BY
Strauch, Nolan, Neale,
Nies & Bronaugh
ATTORNEYS

Jan. 20, 1970   M. L. FREEMAN   3,490,734
BALL VALVES
Filed Feb. 14, 1966   5 Sheets-Sheet 5

INVENTOR
MATHEW L. FREEMAN

BY 
ATTORNEYS

United States Patent Office 3,490,734
Patented Jan. 20, 1970

3,490,734
BALL VALVES
Mathew L. Freeman, Mars, Pa., assignor to Rockwell Manufacturing Company, Pittsburgh, Pa., a corporation of Pennsylvania
Filed Feb. 14, 1966, Ser. No. 527,291
Int. Cl. F16k 25/00, 5/08; B23p 15/26
U.S. Cl. 251—175          40 Claims

ABSTRACT OF THE DISCLOSURE

A ball valve and method of making same wherein an elastically deformable, ported, ball type plug is assembled in a valve body by forcing it through a smaller flow passage in the valve body to position the plug for operation in a valve plug cavity which is formed in the valve body between the inlet and outlet fluid flow passages.

---

The present invention relates to ball type valves and to methods and apparatus for their manufacture.

This invention is particularly concerned with the type of ball valves wherein the movable valve element is an essentially spherical, ported ball type plug which is rotatable about an axis perpendicular to the pipeline axis on cooperating seating surfaces in the valve body. These seating surfaces surround the inner ends of the fluid inlet and outlet passages which are formed in the valve body and which open into a cavity receiving the ported ball. The major diameter of the ball is required to be larger than the inlet and outlet ports defined by the body seating surfaces to provide the port in the ball with a diameter that is about the same as the internal diameter of the pipe in which the valve is installed.

There are several conventional methods of making and assembling ball valves of the foregoing type. One method provides for the top entry of the ported ball through a bonnet flange. Another involves the construction of a multipart valve body having ends that are screwed or otherwise secured to a larger center section to enable the assembly of the ported ball in the valve body. Other methods involve the fabrication of the valve parts around the ported ball. In all of these methods, special valve body constructions are required to facilitate the assembly of the ported ball valve member with the other parts of the valve. Such structural features as the bonnet flange and multipart valve body, however, add to the expense and labor involved in manufacturing the valve.

The present invention contemplates a unique ball valve construction wherein an oversized, ported ball type plug is made of distortable, elastomeric material and is assembled in the valve by forcing it through a smaller fluid passage and into the enlarged cavity in the valve body where it returns to its original shape except for a slight compression against the internal wall of the body to obtain a fluid tight seal. According to this invention, therefore, the valve body may be fabricated as one piece, requiring no joints, segments, or separate valve body seats to facilitate the assembly of the ported ball plug therein. The valve body may adavntageously be formed from a tube or pipe section of any suitable, ductile material, cast from non-ductible metal or plastic, or molded from ceramic material. Furthermore, the ported ball plug is advantageously made as one piece with integral seating surfaces for engagement with smooth internal surfaces of the body. Accordingly, no separate seat rings or stepped body formations are needed to effect a seal between the valve body and the plug. This invention thus provides for a simplified ball valve construction consisting only of three separate major parts: the valve body, the ported ball plug, and an operating stem tang which are easily and quickly assembled to significantly reduce costs of manufacture and labor.

Thus, a primary obejct of this invention is to provide a novel ball valve structure having an elastomeric, ported, ball valve member which is assembled in place by forcing it through a smaller fluid passage in the valve body. An ancillary object is to provide a novel method of making and assembling the parts of a ball type valve whereby the costs of manufacture are significantly reduced as compared with conventional methods.

Another related object of this invention is to provide a novel apparatus for forcibly inserting an oversized elastomeric ball valve member through one of the fluid passages in the valve body.

Still another object of this invention is to provide a novel ball valve structure wherein all the openings into the valve member cavity in a one-piece valve body are smaller than the maximum diameter of the ported ball plug therein.

A further object of this invention is to provide a novel ball type valve wherein the ported ball valve member seals bubble tight to fluid under normal operating pressures, but unseats to allow leakage at excessive fluid pressures and reseats when the excess pressure is dissipated.

Yet another object of this invention is to provide a ball valve with a novel valve body structure which allows an elastomeric ported ball plug to distort into either of the fluid passages and to easily be turned between valve closed to valve opened positions without pinching or shearing the elastomeric material.

These and other objects will appear as the description proceeds in connection with the appended claims and the annexed drawings wherein:

Figure 1:
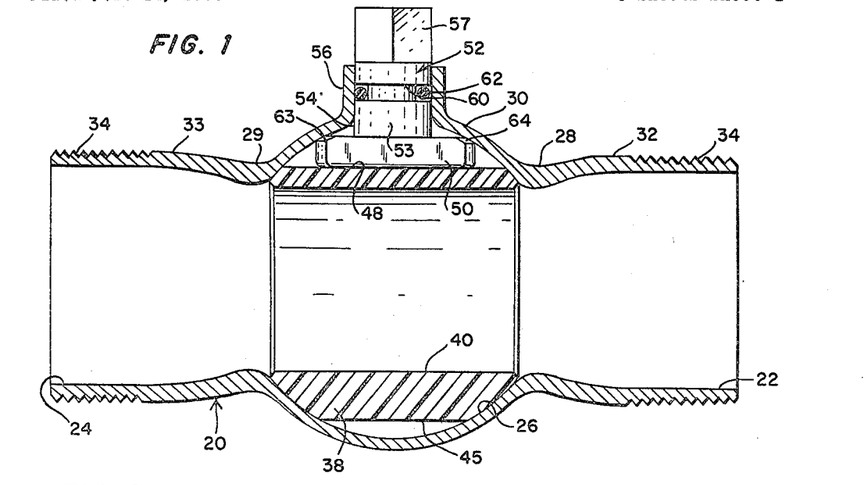
FIGURE 1 is a longitudinal section of a ball-type plug valve constructed according to this invention.

Referring now to the drawings and particularly to FIGURE 1, the valve according to a preferred structural embodiment of this invention comprises a rigid, one-piece, metal body 20 having opposed, axially aligned, similar, cylindrical fluid flow passages 22 and 24 on opposite sides of an enlarged central plug receiving cavity or chamber 26. The valve, as shown in this embodiment, is a two-way valve, and for purposes of this disclosure, passage 22 may be considered on the outlet or downstream side and passage 24 may be considered on the inlet or upstream side.

As shown in FIGURE 1, body 20 is of generally tubular configuration and is formed with reduced diametered necked sections 28 and 29 at the juncture of passages 22 and 24 with chamber 26. Between necked sections 28 and 29, body 20 is formed with a spherically bulged section 30 which defined chamber 26. Necked sections 28 and 29 integrally join section 30 to uniformly diametered tubular end sections 32 and 33 which are externally threaded at 34 for attachment to a pipeline.

The diameters of passages 22 and 24 respectively defined by tubular sections 32 and 33 are preferably equal to the internal diameter of the pipeline in which the valve of this invention is installed and are greater than the internal throat diameters defined by necked sections 28 and 29. Necked sections 28 and 29 are formed with inverse curvatures relative to bulged section 30. Passages 22 and 24 are thus provided with gradually converging inner end sections terminating in fluid inlet and outlet ports at the throats defined by necked sections 28 and 29.

Still referring to FIGURE 1, chamber 26 is formed with a substantially spherical internal wall surface which mates with the external spherical periphery of a ball type plug 38. Each of the necked sections 28 and 29 smoothly merge with section 30 at a point where a tangent line is common to both radii of curvature of the bulged section and each necked section. Body 20 thus is formed with a continuous, smooth internal contour which is free of abrupt changes of configuration, sharp edges, recesses, and pockets.

Preferably, the wall thicknesses of tubular sections 32 and 33 are uniform and equal to the wall thickness of the pipeline for which the valve is seized. These sections thus have the same pressure and temperature rating as applied to the piping when body 20 is formed from the same material. To meet code requirements and to provide a uniform stress, the thicknesses of necked sections 28 and 29 are somewhat greater than tubular sections 32 and 33. The wall thickness of section 30 is uniform and advantageously somewhat less than the wall thicknesses of sections 28, 29, 32, and 33. Since section 30 is formed with a spherical configuration as compared with the tubular configurations of sections 28, 29, 32 and 33, however, it has the same pressure rating as sections 28, 29, 32, and 33. From the standpoint of a pressure vessel, therefore, all sections of body 20 are substantially at the same stress level. Highly efficient use of valve body material is thus obtained.

Owing to its configuration, body 20 may conveniently be shaped from ductile pipe or tubing by conventional forming methods such as, for example, hydraulic forming, forming methods using an elastomer insert, explosive forming, or magnetic forming. The tubing or pipe from which body 20 is formed preferably is of the same nominal size and has the same wall thickness as that of the pipeline for which the finished valve is sized. By distending a central portion of the pipe or tubing to form chamber 26, the desired reduced wall thickness of section 30 is readily obtained. The necking operation for forming sections 28 and 29 collapses material radially inwardly with the result that the thickness of sections 28 and 29 will be greater than that of sections 32 and 33 to obtain the desired uniformity of stress.

As shown in FIGURES 1–4, ball plug 38 is preferably formed in one piece from one or more suitable elastomeric materials and has a uniformly diametered, cylindrical through port 40 which is closely equal to the fluid passage throat diameter at necked sections 28 and 29 to avoid flow retarding restrictions. When the valve is open, as shown in FIGURE 1, port 40 is substantially continuous with passages 22 and 24. At opposite ends, port 40 terminates in the spherical surface 42 of plug 38 which preferably otherwise comprises the entire outer surface of plug 38 except for top and bottom flats at 44 and 45. Flats 44 and 45 are advantageous since they reduce the amount of material needed to form plug 38.

Figure 5:
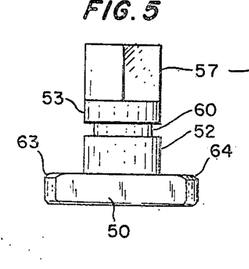
FIGURE 5 is a side elevation of the integral stem and tang piece illustrated in FIGURE 1.
Figures 6, 7:
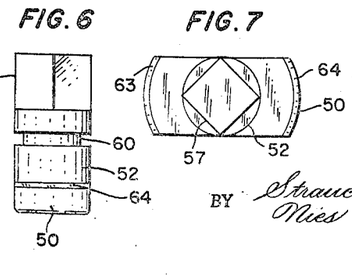
FIGURE 6 is an end elevation of the stem and tang piece shown in FIGURE 5.
FIGURE 7 is a plan view of the stem and tang piece illustrated in FIGURES 5 and 6.

At its upper end, plug 38 is formed with a flat-bottomed, flat-sided, straight, upwardly opening groove 48 for receiving a T-shaped, flat-sided tang 50. Groove 48 extends parallel with the axis of port 40 and is medially intersected by a vertical plane containing the axis of port 40. Tang 50, as shown in FIGURES 5–7, is formed with a rectangular cross-section and is integral with a valve stem 52 having a cylindrical trunnion section 53. Stem 52 extends coaxially through a circular opening 54 in body 20 and through a bearing collar 56 along an axis that normally intersects or at least extends closely to the longitudinal axis of port 40. The upper end of stem 52 protruding beyond collar 56 terminates in a square section 57 for engagement by a wrench or other suitable tool to turn stem 52 and, consequently, plug 38 about an axis that is substantially normal to fluid flow through chamber 26.

Stem section 53 is journalled in collar 56 and is formed with an annular, outwardly opening recess 60 for receiving a resilient O-ring 62. O-ring 62 is compressed against the internal wall of collar 56 to establish a fluid tight seal between stem 52 and body 20. When torque is applied to the upper end of stem 52, plug 38 is rotated about its central axis, which lies on the axes of stem 52 and the collar 56, through engagement of the sides of tang 50 with the sides of groove 48.

Collar 56 axially aligns with opening 54 and is formed with an internal diameter equal to that of opening 54. Advantageously, collar 56 is integral with body 20 although it may be formed separately and welded or otherwise fixed to body 20.

The ends of tang 50 extend beyond opposite sides of opening 54 and terminate in upwardly facing shoulders 63 and 64. Shoulders 63 and 64 provide stop abutment surfaces which seat against the internal wall of bulged section 30 to prevent the integral tang and stem piece from being blown out by internal fluid pressure. Shoulders 63 and 64 also act as bearing surfaces against the body wall.

In the valve body construction of this invention all of the openings into chamber 26 are appreciably smaller than the maximum diameter of plug 38. Plug 38, which is larger than the internal diameter of tubular sections 32 and 33, is inserted into chamber 26 by forcing it through either passage 22 or 24 in a manner to be described in detail later on.

Figure 2:
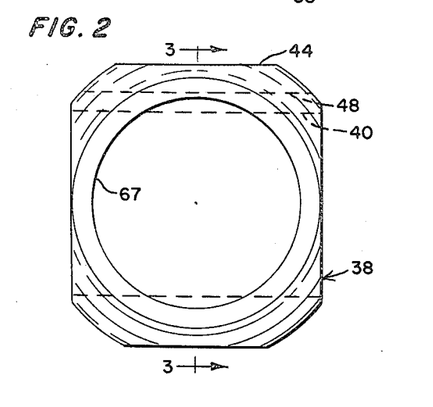
FIGURE 2 is a side elevation of the ported ball type plug shown in FIGURE 1.
Figure 3:
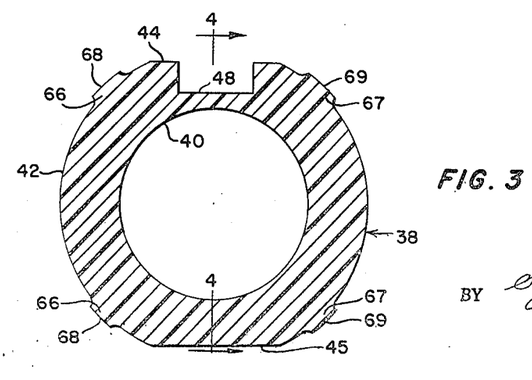
FIGURE 3 is a section taken substantially along lines 3—3 of FIGURE 2.
Figure 4:
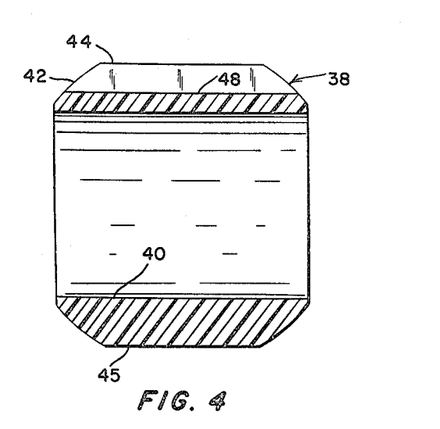
FIGURE 4 is a longitudinal section of the ball type plug shown in FIGURES 1–3 as taken substantially along lines 4—4 of FIGURE 3.
Figures 8, 9:
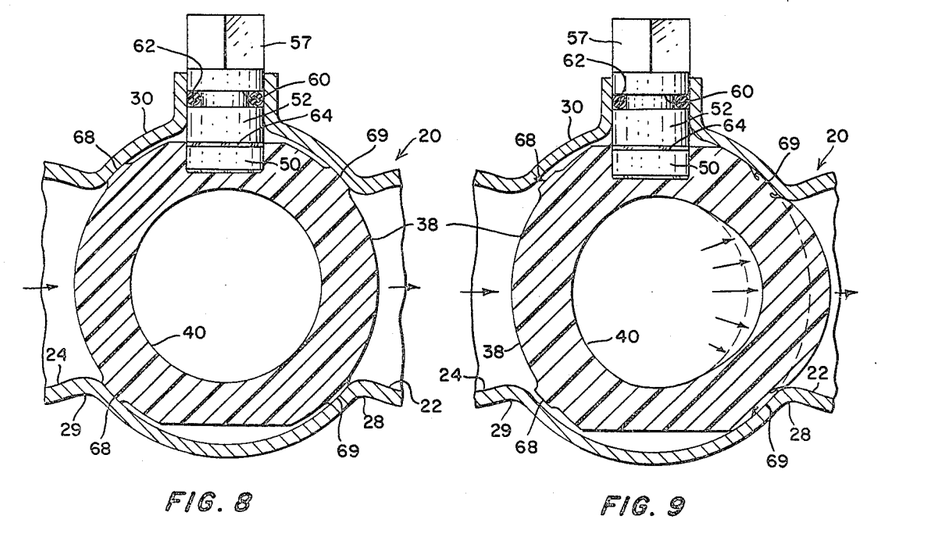
FIGURES 8, 9 and 10 illustrate the valve of FIGURE 1 in closed position and show the configuration of the elastomeric ball type plug under different fluid pressure condition.

As shown in FIGURES 2, 3, and 8, plug 38 preferably is integrally formed with a pair of upstream and downstream raised, annular seats 66 and 67. Seats 66 and 67 are formed on opposite sides of plug 38 along a common axis normally intersecting the longitudinal axis of port 40. The remaining spherical periphery 42 is relieved to provide a smaller radius than that of seats 66 and 67.

Seats 66 and 67 are respectively formed with curved sealing surfaces 68 and 69 which are contained in a spherical envelope and which normally matingly seat against the smooth internal periphery of chamber 26. When plug 38 is turned 90° from its valve opened position to its valve closed position shown in FIGURE 8, surfaces 68 and 69 bear against the internal periphery of bulged section 30 along annular interfaces which surround the inner ends of passages 22 and 24 respectively. As a result, separate seat rings and seals to provide the plug-to-body seal are not required in the valve of this invention.

Surfaces 68 and 69 are formed along a diameter that is greater than the internal diameter of body section 30 to provide an interference fit whereby seats 66 and 67 are slightly compressed in chamber 26 for establishing an initial seal with the valve body, without the use of springs or the like. The magnitude of this interference fit and the width of surfaces 68 and 69 may be varied to change the operating torque and pressure rating. One suitable interference fit for a spherical valve plug chamber having a 3 inch internal diameter is 0.020 inch. The remaining periphery 42 of plug 38 may be formed with a diameter equal to the internal diameter of chamber 26 or it may be slightly undersized.

Figure 12:
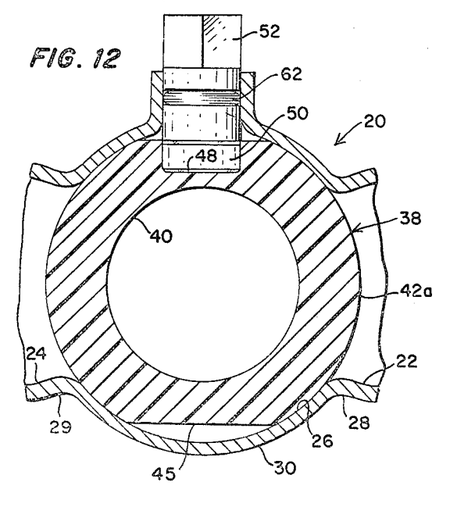
FIGURE 12 is a longitudinal section of a modified valve wherein the ball type plug is formed without raised seats.

Alternatively, plug 38 may be formed without raised seats as shown in FIGURE 12. In this embodiment the entire spherical periphery 42a of plug 38 is uniformly larger in diameter than the internal diameter of chamber 26. Plug 38 is thus compressed over its entire spherical periphery 42a to provide for an initial seal with the interior of body section 30.

FIGURE 8 illustrates plug 38 in its valve closed position when no appreciable differential fluid pressure exists across chamber 26. Under this pressure condition, both seats 66 and 67 engage and are slightly compressed against the wall surface of chamber 26 to provide upstream and downstream fluid tight, annular seals surrounding the fluid ports at the inner ends of passages 22 and 24. When the upstream fluid pressure in passage 24 becomes greater than the downstream pressure in passage 22, plug 38 is loaded and effectively floats against its downstream seat.

As the fluid pressure differential across plug 38 increases, the compression of seat 67 correspondingly increases to increase the width of sealing surface 69, and the downstream portion of plug 38 is distorted into the downstream fluid portion defined by necked section 28 as shown in FIGURE 9. The distortion of plug 38 into the converging mouth of passage 22 pulls surface 68 away from the internal wall of body section 30 allowing fluid from passage 24 to pass up to the upstream edge of surface 69 where it is effectively sealed.

Figure 10:
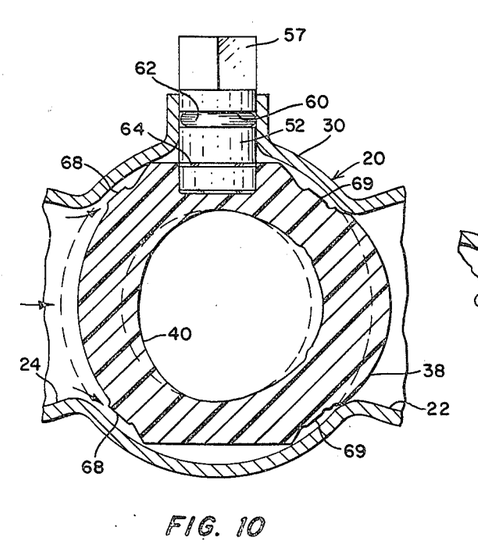

When the pressure of fluid leaking past sealing surface 68 becomes excessive, plug 38, as shown in FIGURE 10, is deformed radially inwardly to pull surface 69 away from the internal wall of body 20, allowing fluid to flow by plug 38 and thus leak into passage 22. Upon relieving the excess pressure in this manner, plug 38 reseats on the internal surface of body section 30 to prevent further leakage. Plug 38 thus functions in the manner of a safety relief valve to dissipate excessive pressures which are well above the normal working pressure rating of the valve and thus prevents the build up of objectionably high pressures in addition to minimizing the amount of torque needed to open the valve. Since plug 38 is appreciably larger in diameter than the mouth of passage 22, it is not blown out of chamber 26 by excessive pressure differentials.

A 2″–100 p.s.i. valve constructed according to FIGURE 1 and having a polyurethane ball plug of 100–A durometer hardness will seal bubble tight to helium at 100 p.s.i. differential pressure. Around 300 p.s.i. differential pressure, the polyurethane ball plug is distorted sufficiently to allow a slight leak of fluid around the ball plug. When the fluid pressure falls below 300 p.s.i. as a result of this leakage, the ball plug again seals tightly against the internal surface of the valve body.

To allow plug 38 to distort into the downstream passages as shown in FIGURE 9, sufficient play is provided between the tang and groove connection to allow relative movement between plug 38 and stem 52.

Owing to the smoothly contoured, internal transition between section 30 and sections 28 and 29, no shearing or pinching of the valve plug elastomeric material occurs if plug 38 is turned between its opened and closed positions when it is distorted partially into either passage 22 or passage 24. Plug 38 may be distorted by fluid pressure into the downstream passage by as much as 7 percent of its major diameter without causing any damage. The smoothly contoured inwardly diverging fluid port at the inner end of passage 22 also reduces the torque needed to open the valve when plug 38 is partially distorted into the port since it gradually compresses the distorted plug portion inwardly as the plug is turned towards its opened position shown in FIGURE 1.

Figure 11:
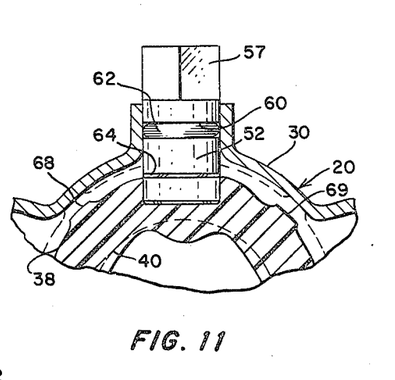
FIGURE 11 is a fragmentary view of the valve as shown in FIGURE 8 and illustrating the ball type plug deformed by excessive pressure in the valve body cavity.

When the valve is closed, excessive pressure build up in chamber 26 as a result of a temperature increase, for example, simply compresses and inwardly deforms plug 38 as shown in FIGURE 11 until at least portions of both seating surfaces 68 and 69 are pulled away from sealing engagement with the interior wall of body 20, allowing fluid to leak out of chamber 26. When the excess pressure is dissipated, surfaces 68 and 69 reseat to seal against the interior of chamber 26.

From the foregoing description it will be appreciated that the valve of this invention consists only of three major, separately formed parts: body 20, plug 38, and the one piece stem and tang 50, 52. The simplicity of this valve structure and the relatively few parts that are employed materially reduces the labor and costs involved in manufacture. This unique valve structure is further suitable for operation at both high and low pressure ratings and is capable of providing a bubble tight seal event at pressures higher than 720 p.s.i. when sufficiently hard elastomeric plug materials are used.

In the manufacture and assembly of the valve just described body 20 and plug 38 are first formed. Owing to its smooth internal contour, body 20 may easily be plated, lined, glass enamelled, or plastic coated to reduce internal corrosion and friction along the sealing surfaces engaging plug 38.

Figure 13:
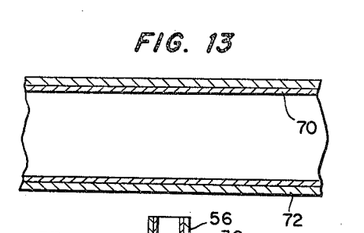
FIGURES 13 and 14 illustrate a method for constructing a modified form of valve body having an internal, thin, corrosion-resistant lining.
Figure 14:
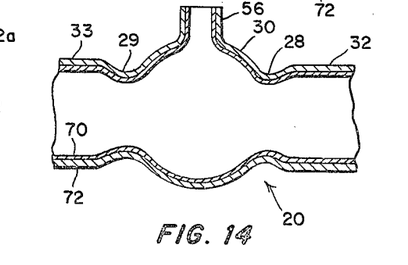

As shown in FIGURES 13 and 14, body 20 may be formed with an internal lining comprising a section of thin corrosion resistant clad tubing 70 received in an outer pipe or tubing section 72. Also, an internal liner of suitable material may be used to improve the strength of body 20.

To form a valve body with two or more internested, concentric straight sections of tubing such as that shown in FIGURE 13, the larger diametered tubing section 72 is expanded hot into an unshown heated external body split die. The smaller diametered tubing section 70 is then inserted and expanded cold into section 72. After removal of the die, tubing 72 is allowed to cool and thus shrinks, providing a high compressive stress in tubing section 70 while the inner tubing section is water cooled. Thus internested, sections 70 and 72 are then formed to the body shape shown in FIGURE 14 and described in connection with the embodiment of FIGURE 1.

Plug 38 may be formed from any suitable elastomeric material that will change its shape sufficiently under load to pass through either of the necked sections 28 or 29 and recover its original shape upon insertion into chamber 26. Plug 38 may be compounded and/or blended with compounds having low coefficients of friction. It also may be coated on its spherical surface with a material having a lower coefficient of friction than the covered elastomeric material.

Figure 15:
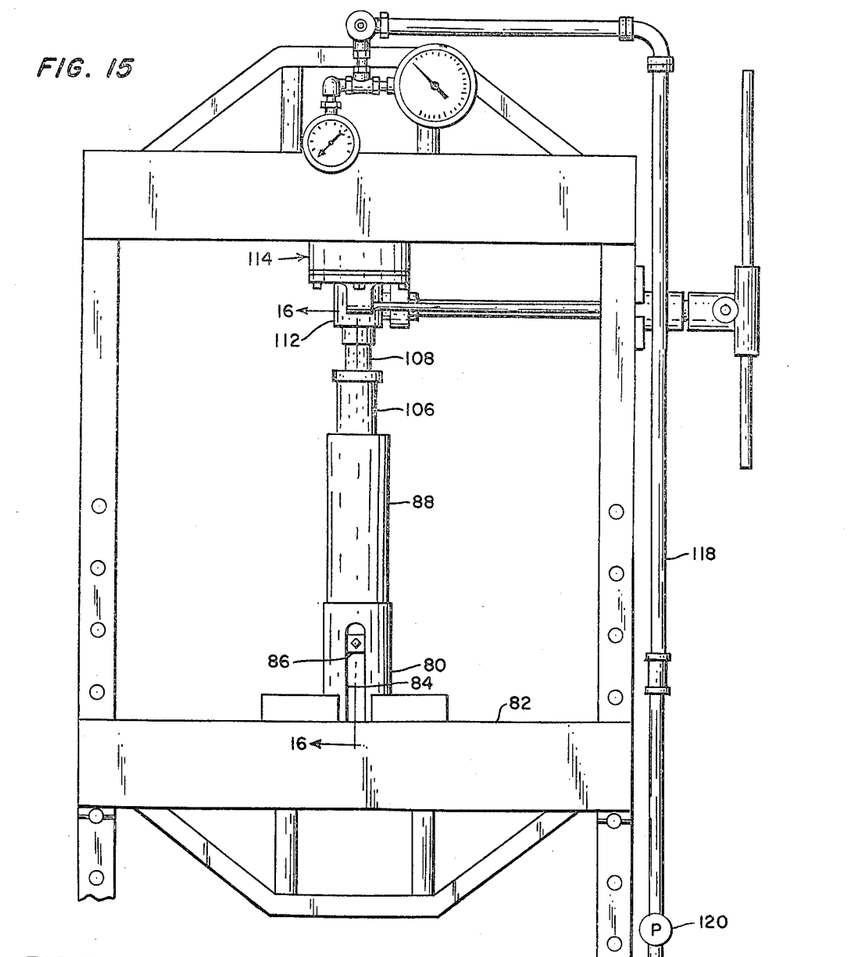
FIGURE 15 is a front elevation of the apparatus for assembling the ball type plug in the valve body in accordance with the principles of this invention.
Figure 16:
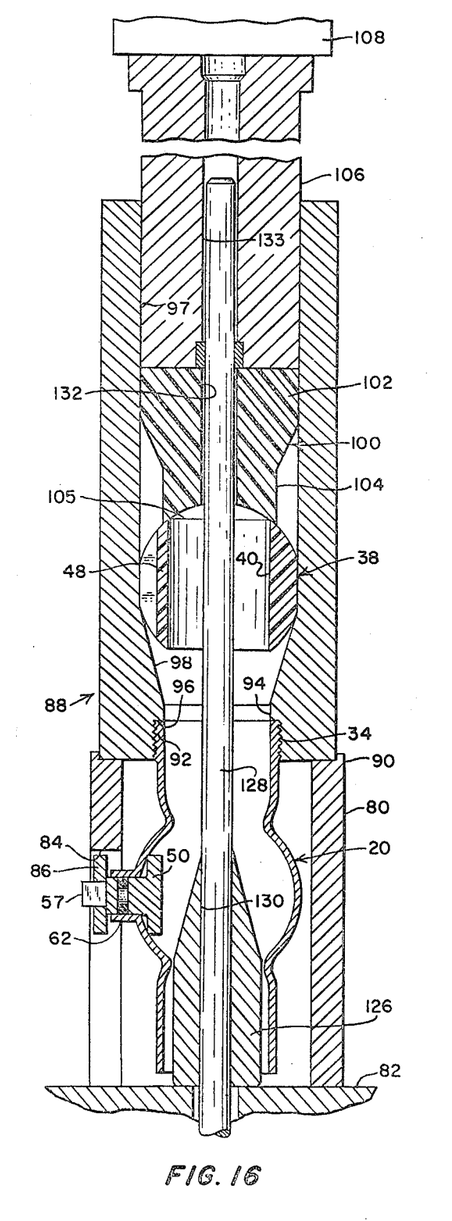
FIGURE 16 is a section taken substantially along line 16—16 of FIGURE 15.
Figure 17:
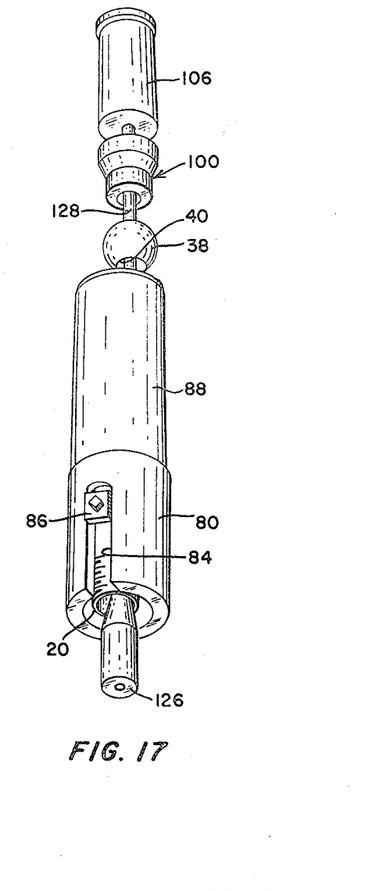
FIGURE 17 is a partially exploded view illustrating the parts shown in FIGURE 16 and the method of assembling these parts preparatory to the insertion of the ball type plug into the valve body.

After body 20 is formed with the configuration shown in FIGURES 1 and 14, the assembly of the preformed one piece stem and tang 50, 52, O-ring 62 and an unshown backup washer is inserted into opening 50 by passing it through either passage 22 or passage 24. Plug 38 is then inserted into chamber 26 by forcing it through either passage 22 or passage 24. One suitable and novel apparatus for forcing plug 38 into chamber 26 is shown in FIGURES 15–17 to comprise a tubular support member 80 which is seated at one end on a rigid base 82. Support member 80 is suitably fixed to base 82 and is adapted to coaxially receive body 20 and the stem and tang piece mounted therein in the manner illustrated in FIGURE 16.

With continued reference to FIGURES 15 and 16, stem section 57 extends freely through a longitudinal slot 84 formed in support member 80. A tang lock, comprising a flat-sided washer 86, is slidably received between opposed, parallel side edges of slot 84. Washer 86 has a square hole through which stem section 57 is adapted to extend. Engagement of washer 86 with the side edges of slot 84 thus locks stem 52 against rotation and retains tang 50 positioned parallel to the longitudinal axis of body 20.

Still referring to FIGURES 15 and 16, a valve plug guide tube 88 is seated on the upper end of support member 80. Member 80 is formed at its upper end with an annular lip 90 surrounding the lower end of tube 88 and retaining tube 88 in axial alignment with support member 80.

Body 20 is threaded into a tapped, counterbored recess 92 formed coaxially in the lower end of guide tube 88. Tube 88 is further formed with a short, uniformly diametered bore section 94 immediately above recess 92. The diameter of bore section 94 is substantially equal to the internal diameter of either tubular section 32 or tubular section 33 depending upon which end of body 20 is screwed into recess 92. The end of body 20 received in recess 92 is adapted to shoulder against an annular, radial seat 96 formed at the juncture between recess 92 and bore section 94. This provides a smooth, uniformly diametered joint for minimizing resistance to the advancement of plug 38 into body 20.

As shown in FIGURE 16, guide tube 88 is coaxially formed with a smooth walled, uniformly diametered bore section 97 which is larger in diameter than bore section 94. Bore section 97 is joined to bore section 94 by a smooth walled, conical section 98 which converges in the direction of plug travel toward the end of body 20 in recess 92. The diameters at opposite ends of conical section 98 are respectively equal to the diameters of bore section 97 and bore section 94. Conical section 98 thus provides a smooth transition for deforming plug 38 with uniformly increasing pressure to a diameter equal to that of bore section 94.

As shown in FIGURE 16, the diameter of bore section 97 is equal to plug 38 and extends to the upper end of guide tube 88. Plug 38 is inserted into guide tube 88 through the upper end thereof and rests at the juncture between conical section 98 and bore section 97 before it is hydraulically loaded for advancement into body 20.

Seated on the top of plug 38 is a cylindrical pusher 100 which has an enlarged, uniformly diametered upper section 102 slidably received in bore section 97. At its lower end, pusher 100 is formed with a reduced diametered section 104 which is coaxially slidable through bore section 94 and into the valve body fluid passage when pusher 100 is advanced downwardly from the position shown in FIGURE 16. The lower end of pusher 100 is formed with a segmental, spherical surface 105 which interfittingly cups over the upper end of plug 38 in guide tube 88. Pusher 100 preferably is formed from a suitable plastic such as polyurethane. Plug 38 is so oriented in guide tube 88 that port 40 is coaxial with tube 88 and slot 48 is in alignment with tang 50 in body 20.

Still referring to FIGURE 16, a cylindrical ram spacer 106 is slidably received in the upper end of tube 88 and is seated on pusher 100. Ram spacer 106 extends beyond the upper end of guide tube 88 and is provided with a flat end face on which a hydraulic ram 108 is seated. Ram 108 is slidably received in a cylinder 112. Cylinder 112 and ram 108 form a part of a conventional hydraulic press 114 having a reservoir 116 connected to cylinder 112 by a pipeline 118. A suitable pump 120 in line 118 furnishes hydraulic fluid under pressure to cylinder 112 to unitarily advance ram 108, spacer 108 and pusher 100 downwardly in guide tube 88.

Preparatory to mounting body 20 in the apparatus shown in FIGURES 15–17, the sub-assembly of the one-piece stem and tang 50, 52, O-ring 62 and an unshown back-up washer is inserted into body 20 through either passage 22 or passage 24, and stem 52 is extended through opening 54 in such a position that tang 50 extends in parallel relation to the body axis as previously described. With the one-piece stem and tang mounted in place, body 20 is inserted into support member 80 and stem section 57 is extended through washer 86 in slot 84. Body 20 then is threaded into the lower end of guide tube 88 until it shoulders against seat 96.

A ball plug orienting cone mandrel 126 is then inserted into body 20 through the lower end thereof and is fixed by suitable means to base 82. Plug 38, to be assembled in body 20, thereafter may be inserted into guide tube 88 and oriented in a position where groove 48 aligns with tank 50 and port 40 aligns with the axis of body 20. A travelling mandrel 128 comprising an axially displaceable, cylindrical rod is inserted through a coaxial bore 130 in mandrel 126. Mandrel 128 is extended coaxially through body 20 and through port 40 of plug 38 in guide tube 88. Pusher 100 and ram spacer 108 are then slidably inserted into the upper end of guide tube 88. The upper end of mandrel 128 slidably extends through aligned bores 132 and 133 respectively formed in pusher 100 and ram spacer 106. In this assembly of parts, pusher 100 is seated on plug 38 and ram spacer 106 is seated on pusher 100.

The assembly of valve and apparatus parts is then placed in hydraulic press 114 as shown in FIGURE 15. Operation of pump 120 advances ram 112 downwardly to force ram spacer 106 into guide tube 88 to axially advance pusher 100 and plug 38 ahead of it. As plug 38 is forced down through conical section 98, it is compressed radially inwardly causing the elastomeric material to be depressed into port 40. The diameter of plug 38 is reduced radially by conical section 98 to essentially the same diameter as bore section 94 to thereby provide for the smooth advancement of plug 38 into passage 22 of body 20.

Continued advancement of plug 38 through passage 22 toward chamber 26 causes plug 38 to elongate axially as it moves through necked section 28 since the annular area of plug 38 between port 40 and its external periphery exceeds the cross sectional area of body 20 at the throat of section 28 less the cross sectional area of travelling mandrel 128. At this stage, the diameter of port 40 is reduced sufficiently such that mandrel 128 is gripped by the internal wall surface of port 40 for unitary travel with plug 38 as the plug advances through necked section 28 into chamber 26. Mandrel 128 maintains port 40 with a diameter that will enable plug 38 to be fed along the conical periphery of mandrel 126.

The cone of mandrel 126, as shown in FIGURE 16, extends into chamber 26 and diverges in the direction of ball travel into body 20. Thus, as plug 38 nears the center of chamber 26, it expands and feeds itself along the cone of mandrel 126. By fixing mandrel 126 in position, plug 38, as it feeds itself along the mandrel cone, grips the conical periphery and is thereby retained in a position where groove 48 aligns with and receives tang 50. Thus, as plug 38 completes its entry into chamber 26, port 40 is aligned with the axis of body 20 and groove 48 is aligned and fits around tang 50.

Once within chamber 26, plug 38 recovers its original shape except for the compression against the interior wall surface of chamber 26 for establishing the initial sealing contact between plug 38 and body 20. It will be appreciated that plug 38 during its insertion into body 20 is not stressed beyond its elastic limit with the result that permanent set or distortion is avoided. This simple operation thus completes the assembly of valve parts.

After forcibly inserting plug 38 into chamber 26, mandrel 126 and ram spacer 106 are then removed. Pusher 100 which is in the neck of body 20 and gripping mandrel 128 may then be removed by exerting axial force on mandrel 128 with a small unshown ram. Although the foregoing apparatus is one preferred embodiment for carrying out the method of inserting plug 38 into body 20, it is clear that the method of assembling the valve parts according to this invention may be performed by any suitable means.

Figure 18:
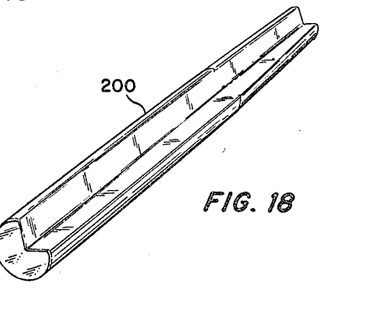
FIGURE 18 is a perspective view of a tool for orienting a ball plug that has become misaligned during its advancement into the valve body.

Occasionally, plug 38 may become misaligned with respect to tang 50 as it is advanced into chamber 26. If this occurs, tang 50 displaces a portion of the elastomeric material of plug 38 into port 40. To re-orient plug 38, a tool consisting of a slotted bar 200, as shown in FIGURE 18, is inserted into port 40. The bulge of material into port 40 caused by the displacement of material by tang 50 fits into the slot of bar 200 and is gripped thereby so that plug 38 may be easily rotated by manipulation of bar 200 to a position where tang 50 fits into groove 48.

In practice, from 2000 to 9000 pounds of force are required to advance a 100–A diameter polyurethane ball plug into a 2 inch valve body, depending upon the amount of material and shape of the ball plug. Suitable lubricant, such as, for example, brake fluid, may be used to reduce the friction between the interengaging surfaces of plug 38 and body 20.

Figure 19:
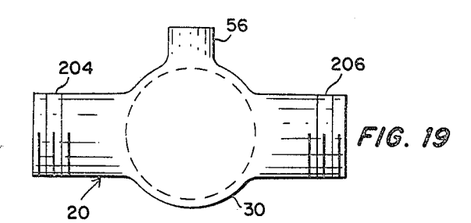
FIGURES 19–21 illustrate sequentially steps of a modified method for making and assembling the valve parts shown in FIGURE 1.
Figure 20:
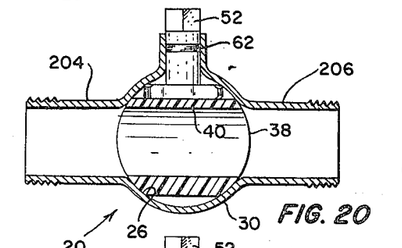
Figure 21:
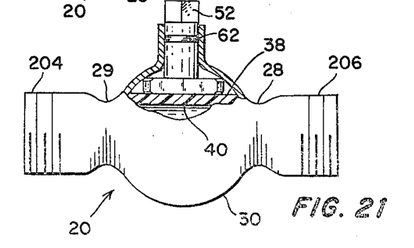

A modified method of making and assembling the valve of FIGURE 1 is illustrated in FIGURES 19–21. This method is useful when it is desired to form valve plug 38 from stiffer elastomeric material which would become permanently distorted by advancement through either neck section 28 or neck section 29. When employing such stiffer elastomeric materials, such as Teflon or nylon, to form plug 38, the valve body is first formed with bulged section 30 from a straight tubular piece leaving uniformly diametered tubular end sections indicated at 204 and 206 respectively in FIGURE 19. Plug 38 formed from stiffer elastomeric material is then inserted into the chamber defined by section 30 by forcing it through either tubular section 204 or tubular section 206 by the method and with the apparatus previously described.

After plug 38 is positioned in section 30, as shown in FIGURE 20, the inner ends of tubular sections 204 and 208 are necked down in any suitable, conventional manner to provide body 20 with necked sections 28 and 29 as shown in FIGURE 21.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of installing an elastically deformable ball type valve member with a port therethrough in a hollow valve body having fluid inlet and outlet passages and a cavity therebetween wherein at least one of said passages is smaller than the maximum diameter of said valve member, said method comprising the step of inserting said ball valve member into said cavity by forcing it through said one passage.

2. The method defined in claim 1 wherein said member is forcibly displaced through said one passage along an axis aligning with the port therein to cause the elastically deformable material to elongate and to be depressed into said port.

3. The method defined in claim 2 comprising the step of pressing said valve member with progressively increasing pressure radially inwardly with respect to said port as it is advanced toward said passage.

4. The method defined in claim 1 wherein said valve member is formed with an external slot for receiving a stem tang and wherein said valve member is oriented during its advancement into said body to align said slot with a stem tang that is adapted to be carried by said body.

5. The method defined in claim 4 comprising the step of forcibly expanding said port, and retaining said valve member in its oriented position relative to said tang as it is advanced into said cavity.

6. The method defined in claim 5 comprising the step of maintaining said port with a predetermined minimum diameter as it is advanced through said one passage and into said cavity.

7. A method of making a valve comprising the steps of forming an integral valve body with axially aligned fluid inlet and outlet passages separated at their inner ends by an enlarged cavity of generally spherical configuration, forming a ball valve member with a port therethrough from elastically deformable material and with a maximum diameter that is larger than at least one of said passages, and inserting said thusly formed ball valve member into said cavity by forcing it through said at least one passage along an axis aligning with the port therein.

8. The method defined in claim 7 comprising the steps of forming a stem tang for said valve member and inserting said tang into a side opening in said body by passing it through one of said passages prior to the insertion of said valve member.

9. The method defined in claim 8 comprising the steps of forming an external slot in said valve member prior to insertion into said body and angularly orienting said valve member to receive said tang in said slot upon advancement of said valve member into said cavity.

10. The method defined in claim 7 wherein said body is formed from a tubular member having uniform wall thickness.

11. The method defined in claim 10 comprising the steps of forming said tubular member with an intermediate spherically bulged section to define said cavity and providing said tubular member with reduced diametered, necked sections at the juncture of said passages with said cavity.

12. The method defined in claim 11 wherein said necked sections are formed prior to insertion of said valve member into said cavity.

13. The method defined in claim 11 wherein said necked sections are formed after said valve member is inserted into said cavity.

14. The method defined in claim 11 comprising the step of providing said tubular member with an internal, corrosion resistant lining before forming said bulged and necked sections.

15. A valve comprising a body having fluid inlet and outlet passages opening at their inner ends into a valve plug cavity, a one-piece, ported, elastically deformable ball type plug rotatable within said cavity between positions where it blocks and provides fluid communication between said passages, and an operating stem extending through said body for said plug, said plug having a maximum diameter which is greater than said passages and being deformable below its elastic limit to a diameter that is smaller than the diameter of said passages at least at the outer ends thereof whereby said plug is insertable into said cavity through one of said passages.

16. The valve defined in claim 15 wherein said body is a one piece member and wherein the only openings into said cavity are smaller than the maximum diameter of said plug.

17. The valve defined in claim 15 comprising coacting sets of upstream and downstream seating surfaces formed integral with said body and said plug respectively for establishing upstream and downstream fluid tight seals surrounding the inner ends of said passages.

18. The valve defined in claim 17 wherein said cavity is formed with an internal, smoothly contoured, spherical periphery of substantially uniform diameter and wherein said seating surfaces of said body are a part of said spherical periphery.

19. The valve defined in claim 18 wherein the external periphery of said plug is spherical at least throughout the region of said seating surfaces on said plug.

20. The valve defined in claim 19 wherein said plug is received with an interference fit in said cavity over the entire spherical periphery thereof.

21. The valve defined in claim 20 wherein the entire spherical periphery of said plug is uniformly diametered.

22. The valve defined in claim 19 wherein the seating surfaces on said plug are formed on raised seats each having a spherical radius that is greater than the radius of curvature of the remaining periphery of said plug, said seats being received with an interference fit in said cavity, the diameter of said remaining plug periphery being no greater than the internal diameter of said cavity.

23. The valve defined in claim 19 wherein said body is formed with a spherically bulged section between said passages to define said cavity and with necked sections at the juncture of said passages with said cavity, each necked section defining a fluid port at the inner end of its associated passage that diverges in axially opposite directions, the radii of curvature and arrangement of said bulged and necked sections being such that each of said necked sections smoothly merges with said bulged section along a substantially common tangent line.

24. The valve defined in claim 23 wherein said plug is deformable below its elastic limit to a diameter less than the internal throat diameters of said necked sections, whereby said body is formable with said necked sections prior to the insertion of said plug into said cavity.

25. The valve defined in claim 23 wherein said plug is partially distortable into the inwardly diverging portion of the downstream one of said necked sections.

26. The valve defined in claim 23 wherein the wall thickness of said bulged section is less than the wall thickness of the remaining portion of said body.

27. The valve defined in claim 26 wherein said body comprises a preformed tubular section.

28. The valve defined in claim 16 wherein said stem is journalled on a bearing surface formed on an integral part of said body.

29. The valve defined in claim 25 wherein the seating surfaces on said plug are formed on raised seat ridges having an interference fit with the internal wall of said cavity and being capable of compression and distention by distortion of said plug into either of said passages under the influence of a fluid pressure differential across said cavity in valve closed position.

30. The valve defined in claim 25 wherein said plug and said body are so shaped and arranged that at least a part of the portion of said plug distorted in said downstream passage is forced away from said body to allow fluid leakage when fluid pressure exceeds a predetermined maximum.

31. The valve defined in claim 19 wherein said plug is provided with flats at opposite sides thereof.

32. The valve defined in claim 16 wherein said plug is formed with an external slot and wherein a tang formed rigid with said stem is received in said slot.

33. The valve defined in claim 32 wherein said tang is integral with said stem and has shoulders providing stop abutment surfaces which cooperate with internal surfaces on said body for preventing said tang and stem from being blown out by fluid pressure.

34. The valve defined in claim 32 wherein said slot is parallel with the longitudinal axis of the port through said plug.

35. An apparatus for assembling a ported, elastically deformable ball valve member in a valve body having axially aligned fluid inlet and outlet passages opening at their inner ends into a valve member cavity and being smaller than the maximum diameter of said valve member, said apparatus comprising a base, a guide tube supported on said base and adapted to receive a ball valve member for forcible insertion into said cavity through one of said passages, means for supporting said body in fixed, axially aligned relation with said guide tube at one end thereof, means for forcibly urging a valve member in said guide tube through the passage adjacent said tube and into said cavity, and means adapted to be received in the port of said plug as it is advanced into said cavity for expanding and maintaining the angular orientation of said plug.

36. The apparatus defined in claim 35 wherein said means for expanding and maintaining the orientation of said plug comprises a fixed mandrel extending partially into said cavity.

37. The apparatus defined in claim 36 comprising mandrel means adapted to extend through said port as said plug is advanced through said one passage and into said cavity for maintaining said port with a minimum diameter that will receive said fixed mandrel.

38. The apparatus defined in claim 37 wherein said fixed mandrel has a conical surface extending into said cavity and diverging in the direction of plug travel into said body, and wherein said mandrel means comprises an axially displaceable rod extending coaxially through said fixed mandrel and the valve body, the diameter of said rod being sufficiently large that it is gripped by the internal wall of said port for unitary advancement with said plug as said plug is advanced through said one passage, said plug becoming elongated as it advances through said passage to reduce the diameter of said port.

39. The apparatus defined in claim 35 wherein said body is adapted to be fixed to one end of said guide tube, said tube having an internal conical surface adjacent said end that converges in the direction of valve member travel toward said body.

40. A valve comprising a body having upstream and downstream fluid passages opening at their inner ends into a valve member cavity, a ported, elastically deformable, ball valve member rotatable within said cavity between positions where it respectively blocks and provides fluid communication between said passages, an operating stem rotatably extending through an aperture in said body, means operatively connecting said stem to said ball valve member to provide for rotation of said member between said positions by rotating said stem, said ball valve member having a diameter that is appreciably larger than the diameter of at least the inner end of said downstream passage, and coacting sets of annular seating surfaces on said valve member and body for providing continuous sealing interfaces surrounding the inner ends of said passages when said valve member is in its blocking position, said valve member being sufficiently deformable and displaceable under the influence of a predetermined fluid pressure differential across said cavity to distort, when in its blocking position, partially into the inner end of said downstream passage, the valve member seating surfaces at said inner end of said downstream passage being deformed against said body by distortion of said valve member partially into said downstream passage to provide for an increase in the width of the sealing interface area surrounding the inner end of said downstream passage, said seating surfaces on said valve member being formed on raised, annular seats which are integral with said elastically deformable valve member, the downstream seat being compressed against said body to increase the width thereof by distortion of said member into said downstream passage, said valve member being sufficiently deformable under the influence of said predetermined pressure differential to pull away from the seating surface of said body at the inner end of said upstream passage and provide for fluid leakage into said cavity upon distortion to a predetermined magnitude into said downstream passage, and the downstream one of said seats being sufficiently deformable under the influence of a predetermined pressure of fluid leakage into said cavity to provide for leakage between said cavity and said downstream passage.

References Cited

UNITED STATES PATENTS

| | | | |
|---|---|---|---|
| 2,387,013 | 10/1945 | Fuller | 251—366 |
| 3,231,235 | 1/1966 | Anderson et al. | 251—315 |
| 3,348,805 | 10/1067 | Sanctuary | 251—315 |
| 3,216,696 | 11/1965 | Cooley et al. | 251—175 |

FOREIGN PATENTS 1,012,501  7/1957  Germany.

M. CARY NELSON, Primary Examiner

M. O. STURM, Assistant Examiner

U.S. Cl. X.R.

29—157.1; 137—375; 251—315